2 Sheets—Sheet 2.

M. C. KILGORE.

Corn Sheller.

No. 62,857. Patented March 12, 1867.

Witnesses:

Inventor:

United States Patent Office.

MARTIN C. KILGORE, OF WASHINGTON, IOWA.

Letters Patent No. 62,857, dated March 12, 1867.

---

IMPROVEMENT IN CORN SHELLERS.

---

The Schedule referred to in these Letters Patent and making part of the same.

---

TO WHOM IT MAY CONCERN:

Be it known that I, MARTIN C. KILGORE, of Washington, in the county of Washington, and State of Iowa, have invented a new and valuable Improvement in Corn Shellers; and I do hereby declare that the following is a full, clear, and exact description of the construction and operation of the same, reference being had to the annexed drawings, making a part of this specification, and to the letters and figures of reference marked thereon.

Figure 1:
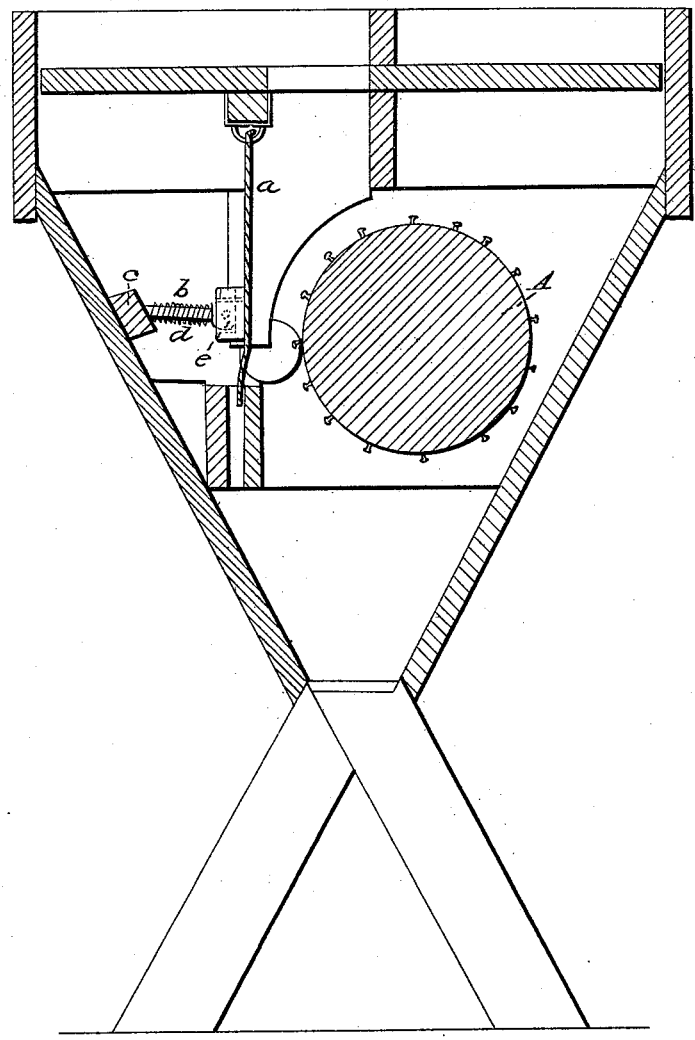

The object of my invention is to construct a corn sheller that shall be simple and cheap in construction, and more perfect in its operation than any similar device heretofore used or known. To this end I construct a box in the form represented on Figure 1, the sides of which are sloped downwards, and which stands upon legs, as shown on said figure.

Letter A is the cylinder of my corn sheller. It is constructed in the usual form, and has a series of spikes upon its periphery, as represented on Figure 2. Letter $c$ is a bar that extends from end to end of the corn sheller. It is placed in a slanting position, and serves as a rest for the spiral springs next mentioned. These spiral springs are marked $b$ and $d$, and are usually four in number, one end of which rests against the bar $c$, and the other is fitted into suitable apertures in the hinged plate $a$. I usually make these apertures as shown by the letter $e$. The hinged plate $a$ extends from end to end of the corn sheller inside the box, and is designed to hold the corn up against the cylinder while the process of shelling is going on. It is hinged in the middle, to allow either end to vibrate without moving the other. The spiral springs $d\ b$ force this hinged plate closely against the ears of corn, and thereby force the corn against the cylinder, as well when a small quantity and small ears are being shelled as when a large quantity and large ears are undergoing that process, and the hinge in the plate secures the same result when a larger quantity or larger ears are placed in one end than is placed in the other, the said springs always regulating the pressure of the hinged plate to the size and number of the ears to be shelled. I make an opening in the bottom of my box for the escape of the shelled corn, and I also make an opening in the side thereof for the passage outward of the cobs. This last-mentioned result is accomplished by placing suitable bars, on which the cobs must move, on an angle or incline towards said last-mentioned opening. I place a cover over the top of my box, in which is an opening or hopper for the reception of the corn in the ear.

Figure 2:
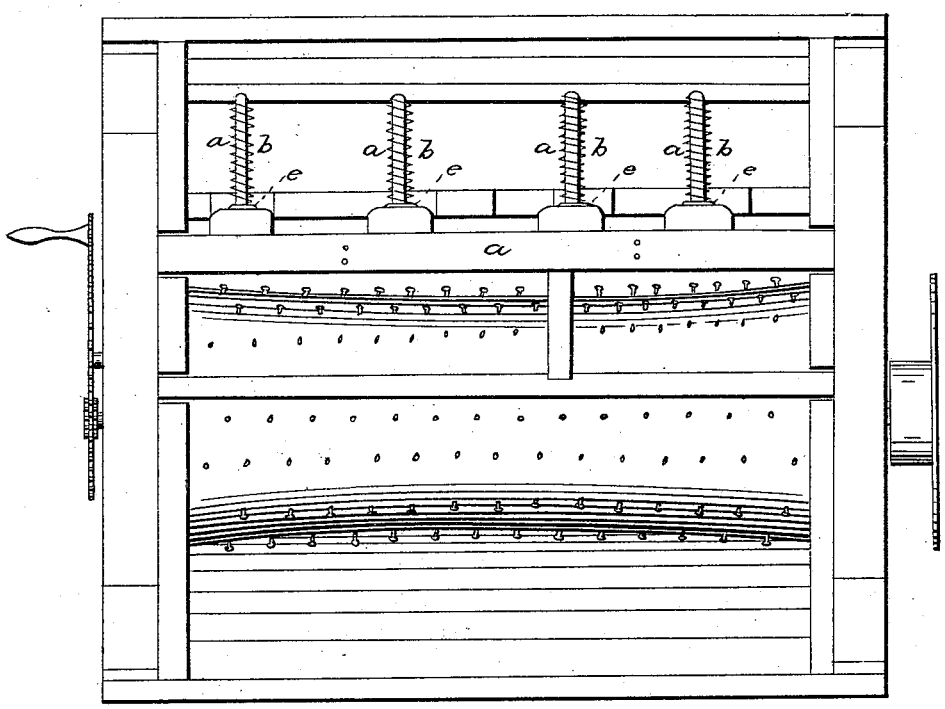

I work my corn sheller either by hand, in the manner indicated, at the left-hand side of fig. 2, or by power applied to the belt-drum shown on the right-hand side of said figure.

What I claim as my invention, and desire to secure by Letters Patent, is—

A corn sheller having a box as described, with plate $a$; springs $d\ b$, bar $c$, and my device as described for the egress of cobs, all constructed, combined, and arranged substantially as herein specified.

MARTIN C. KILGORE.

Witnesses:
N. H. CHAPIN,
GEO. L. CHAPIN.